Dec. 22, 1970    J. BRÜEGGE    3,549,974

VARIABLE DELAY WINDSHIELD WIPER SYSTEM IN MOTOR VEHICLES

Filed Jan. 30, 1968

INVENTOR
Juergen BRUEGGE

By Michael S. Strucker his ATTORNEY

United States Patent Office 3,549,974
Patented Dec. 22, 1970

3,549,974
VARIABLE DELAY WINDSHIELD WIPER SYSTEM IN MOTOR VEHICLES
Juergen Brüegge, Neu-Isenburg, Germany, assignor to Robert Bosch GmbH, Stuttgart, Germany
Filed Jan. 30, 1968, Ser. No. 701,731
Claims priority, application Germany, Feb. 9, 1967, B 91,099
Int. Cl. H02p 5/01
U.S. Cl. 318—443                                8 Claims

ABSTRACT OF THE DISCLOSURE

An arrangement for controlling the operation of windshield wipers in motor vehicles. A pulse emitter in the form of the primary winding of the ignition coil provides a pulse signal having a pulse repetition frequency dependent upon the engine speed. The amplitude of the pulses is limited through a limiting circuit consisting of a resistor and diode network. After the pulse signal becomes amplitude-limited to a predetermined level, the signal is applied to an integrating network. The output of this integrating network is applied to an astable circuit using capacitor-resistance networks for the timing elements of the circuit. A relay is connected to the output of the astable timing circuit, by way of a power transistor. The time intervals during which the relay is energized and de-energized determine the operating times of the windshield wipers.

BACKGROUND OF THE INVENTION

The windshield wipers in motor vehicles are designed so that they have different velocities for medium and severe rain conditions. Usually, two different wiping speeds are provided. When fog or drizzle prevails, the wiping blades operate dry upon the windshield. Such an operating condition results in increased wear of the wiping blades and an increased load upon the motors driving the windshield wipers. Aside from this, the windshield may become scratched or abraded.

In order to prevent such unnecessary wear, the windshield wiper in motor vehicles was, heretofore, set manually so as to correspond to the intensity of the prevailing rain. Such continuous on and off switching, however, caused considerable distraction which was particularly dangerous in heavy traffic situations such as prevail in cities.

In the German Pat. 966,287 a pulse generator is described for windshield wiping arrangements. This pulse generator can switch on the windshield wiping motor for a predetermined time interval. A pulse generator of this type can, for example, be constructed in the form of a thermal switch. Aside from this, an electronic pulse generator for windshield wiping arrangments is commercially available. Such a pulse generator includes an astable switching stage which has its output suitably amplified for purposes of controlling a relay. The time intervals between successive wiping operations can be varied with the aid of an adjustable resistor.

In the conventional pulse generators, however, the optimum time interval set for a predetermined speed did not maintain itself during successive wiping operations after a speed change was incurred, or when prolonged operation prevailed. As a result, the time interval had to be reset or regulated through the use of an manual regulator. From the viewpoint of driving the vehicle, essentially less rain falls upon the windshield in this case. If the pulse generator was set to a large time interval, then this large time interval was not adequate after driving commenced, and the previous wiping speed had to be applied again. From the preceding description of such designs, it is apparent that the wiping arrangement must be manually set especially under heavy traffic conditions, even when a pulse generator is applied. Such manual setting must be made so as to obtain the proper wiping speed and an optimum wiping arrangement.

Accordingly, it is an object of the present invention to provide a pulse generator which overcomes the disadvantages enumerated above. In accordance with the present invention, the time intervals are automatically established as a function of the driving condition of the motor vehicle. For purposes of obtaining a parameter representative of the driving condition of the vehicle, the engine speed, the position of the gas pedal, or the vehicle speed may be used. In the design of any of such arrangements, the longest interval between successive wiping operations takes place at the lowest engine speeds, the idling position of the gas pedal, or the lowest vehicle speed as, for example, when the vehicle is stationary.

It is the particular feature of the present invention that the time interval between successive wiping operations, and thereby the effective wiping speed, is always automatically regulated as a function of the prevailing driving condition of the vehicle. Such regulation is executed automatically without any manual aid. In accordance with the invention, furthermore, an arrangement is required which is no more complex than a conventional pulse generator for windshield wipers.

SUMMARY OF THE INVENTION

An arrangement for controlling the operation of windshield wipers during the rain in motor vehicles. The windshield wipers are operated as a function of a speed characteristic of the vehicle. Such a speed characteristic may be either the engine speed, the position of the gas pedal, or the speed of the vehicle itself. Pulses obtained or derived from the primary winding of an ignition coil give an indication of the engine speed. The amplitude of these pulses are then limited to a predetermined value by a resistor and diode network. An integrating circuit converts the pulse repetition frequency of the pulse signal derived from the ignition coil and applies it to a transistor having an emitter biased by a voltage divider. By way of an adjustable resistor, this transistor actuates an astable multivibrator circuit. The pulse output from the astable multivibrator is applied to a relay by way of an output or power transistor. The actuation of this relay then provides selected durations during which the windshield wiper motors are energized and de-energized. As a result, the operation of the windshield wipers is closely coupled to the speed of the vehicle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
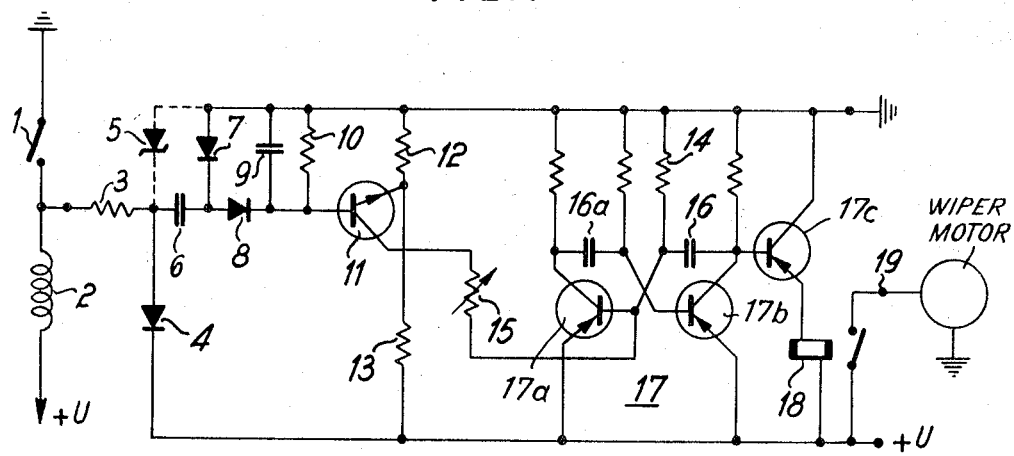
FIG. 1 is an electrical schematic diagram of an electronic arrangement whereby the motors of the windshield wipers in a driving motor vehicle are operated as a function of the speed of the vehicle, in accordance with the present invention.

Referring to the drawing and in particular to FIG. 1, the primary winding 2 of an ignition coil is connected in series with an interrupting switch 1. Through the action of this switch, a D.C. voltage +U is applied periodically across the primary winding 2. As a result, a pulse signal appears at the junction between the switch 1 and the primary winding 2. The pulse repetition frequency of this pulse signal corresponds to the speed of the engine and is proportional to it.

The resulting high pulse level due to the circuit action between the interrupting switch 1 and ignition coil, is limited through a limiting circuit consisting of a resistor 3 and diode or rectifier 4. This limiting circuit limits the pulse level to a predetermined value. It is possible to substitute the Zener diode 5 in place of the diode 4 when desired.

The pulses of limited amplitude are integrated through an integrating network comprising a conventional diode pump. The network includes the capacitor 6, diodes 7 and 8, capacitor 9, and resistor 10. As a result of the integrating process, a voltage appears across the resistor 10 which is proportional to the input pulse frequency.

An astable multivibrator circuit 17 functions through the use of two transistors 17a and 17b, and applies its output signal to an output relay 18 by means of an output switching or power transistor 17c. The switching-on time is determined by the left capacitor 16a, whereas the period between pulses is established by the right-hand capacitor 16 in conjunction with the associated discharge resistors. The discharge resistor 14 is designed to provide maximum time between pulses as, for example, 15 to 30 seconds. The resistor 14 is connected in parallel with an electronic switch 11 in the form of a transistor, and an adjustable resistor 15. When the transistor 11 is turned off, the time between pulses is essentially dependent upon the value to which the adjustable resistor 15 is set.

The emitter voltage of the transistor 11 is determined by the voltage divider consisting of resistors 12 and 13. As a result of the emitter voltage determined in this manner, the voltage appearing across resistor 10 is insufficient to maintain the transistor 11 in the conducting or turned-on state while the engine is idling. If, now, the engine speed is increased by feeding a small amount of gas to the engine, the voltage across the resistor 10 increases beyond the threshold value of the transistor 11, at which the latter is turned on. When this condition occurs, the resistor 14 becomes connected in parallel with the resistor 15. As a consequence, the time interval between consecutive wiping operations becomes automatically decreased. This time interval between successive wiping operations is, in particular, determined by the set value of the resistor 15.

When the motor vehicle is stopped, the voltage across the resistor 10 drops again because of the low idling speed of the engine. In this manner the transistor 11 becomes again turned-off, and the switching stage 17 becomes set to a large time interval.

Figure 2:
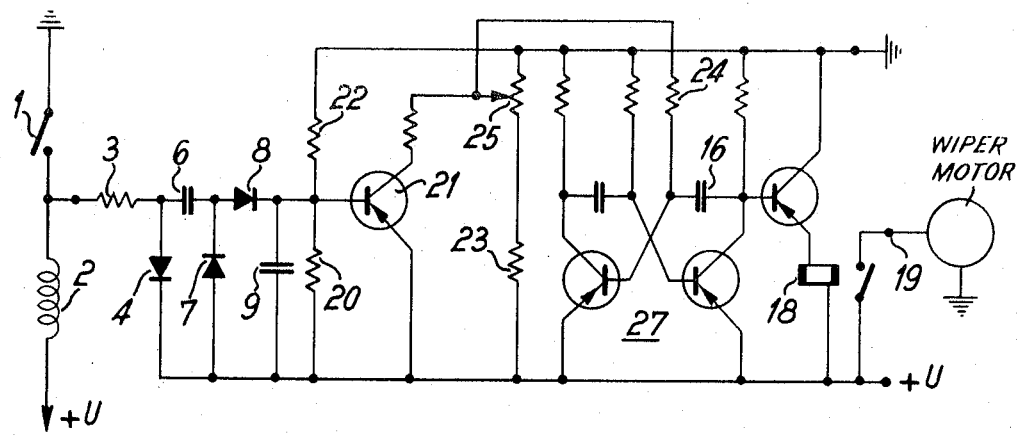
FIG. 2 is an electrical schematic diagram of another embodiment of the arrangement shown in FIG. 1.

FIG. 2 shows another embodiment in which the controlling circuitry for the astable stage 27 is somewhat modified. The circuitry for the limiter and the integrator remains unchanged, and the output voltage which is proportional to the engine speed appears across the resistor 20. Manual control of the time intervals associated with the pulse circuit 27 is derived, in this case, by varying the voltage applied to the free end of the discharge resistor 24. This voltage is obtained from the set state of the voltage divider comprising the variable or adjustable resistor 25, and fixed resistors 23. If the variable resistor is in the form of a potentiometer 25 and the sliding contact of this potentiometer is located at the upper end, a small time interval is established in the pulse circuit 27. When, on the other hand, the sliding contact of the potentiometer 25 is located at the lower end or position, the associated time intervals are increased.

The transistor 21 connected to the output of the integrator, has a predetermined voltage applied to it through means of the voltage divider consisting of resistors 20 and 22. This voltage applied to the transistor 21 by the voltage divider, opposes the output voltage of the integrator. When the engine is idling, the transistor 21 is in the conducting state. Under this condition, the sliding contact of the potentiometer 25 is protected against the short circuiting of the voltage supply +U, by means of a protective resistor. In this manner a large time interval becomes established between successive wiping operations. If the engine speed exceeds the idling speed, the base of the transistor 21 becomes turned-off as a result of the output voltage of the integrator. In this manner, the voltage of the sliding contact of potentiometer 25 acquires its operational value. This voltage of the sliding contact of potentiometer 25 is, in turn, applied to the free end of the resistor 24 for determining the time interval.

It is also quite possible to provide relays in place of the electronic switching devices 11 and 21. With these relays it is then possible to switch not only the time determining discharge resistors, but also the time determining capacitors or the like. Aside from this, it is also possible to derive or sense the speed of the engine through other means than the ignition mechanism. Thus, it is possible, for example, to derive the speed of the engine from the position of the gas pedal or the gas injection rod, rather than directly from the engine. Furthermore, the speed of the motor vehicle can be used. In the latter case, the largest time interval is selected when the vehicle is stationary or moves at a very low speed.

The output voltage of the generator driven by the internal combustion engine can also be used for purposes of controlling the time duration. This can be accomplished, in one way, by measuring the average value of the output voltage of the generator. This measurement is taken before the generator is connected to the battery. The average value of the output voltage varies particularly with the engine speed. Aside from this, a D.C. generator provides a predetermined ripple before being buffered by a battery. When the engine is idling, the generator is normally in a free-running condition. Only when the engine speed exceeds a predetermined value, above the idling speed, is the generator connected to the battery. In the idling state of the engine, the ripple can serve as an A.C. signal and be applied to the astable circuit for purposes of introducing the longer time duration in the latter. At higher engine speeds, on the other hand, the generator becomes connected to the battery and no A.C. signal or ripple appears.

The time interval during which the window wiping motors are switched-on is arranged so that precisely a forward and back motion of the window wiping blades occur. This prevails under normal conditions for successive wiping operations. The accuracy of the time duration for switching-on the window wiping motors is not critical. This results from the condition that the wiping operation is terminated or ended by a special limit switch. At the same time, it is possible to arrange the timing elements of the pulse genertaors 17 and 27 so that one or more complete wiping operations may selectively be obtained during a particular time interval. Under these circumstances, the time interval in question must be established so that the relay 18 and its associated contact 19 be actuated sufficiently long to insure that the last required wiping operation has begun.

It will be understood that each of the elements described above, or two or more together, may also find a useful application in other types of windshield wiper arrangements in motor vehicles differing from the types described above.

While the invention has been illustrated and described as embodied in a windshield wiper arrangement in motor vehicles, it is not intended to be limited to the details shown, since various modifications and structural changes may be made without departing in any way from the spirit of the present invention.

What is claimed as new and desired to be protected by Letters Patent is set forth in the appended claims.

I claim:
1. An arrangement for controlling the operation of windshield wiper motors in motor vehicles comprising, in combination, a signal source providing a signal in dependency on a speed characteristic of said vehicle; switching means connected to said signal source and switching from a first state of operation to a second state of operation when said speed characteristic exceeds a predetermined magnitude, said switching means being in said first state of operation when said speed characteristic is below said predetermined magnitude; adjustable timing means connected to said switching means for applying to said windshield wiper motor operating signals with adjustable time intervals to turn said wiper motor on and off to provide adjustable time intervals between wiping motions of said windshield wipers, said signal source comprising pulse emitting means providing a pulse signal with pulse repetition frequency dependent upon said speed characteristic of said motor vehicle; and frequency-voltage converting means connected to said pulse emitting means for converting said pulse signal into a corresponding continuous voltage signal.

2. The arrangement for controlling the operation of windshield wipers as defined in claim 1, wherein said pulse emitting means comprises an ignition coil of said motor vehicle.

3. The arrangement for controlling the operation of windshield wipers as defined in claim 1, including adjusting means for selectively adjusting said timing means to provide at least one complete wiping operation of said windshield wipers during one cycle of said timing means.

4. The arrangement as defined in claim 1 including limiting means connected between said pulse emitting means and said frequency-voltage converting means for limiting the amplitude of the pulses from said pulse emitting means to a predetermined value.

5. The arrangement for controlling the operation of windshield wipers as defined in claim 4, wherein said limiting means comprises a resistor and diode network.

6. An arrangement for controlling the operation of windshield wipers in a motor vehicle comprising, in combination, motor means coupled to said windshield wipers for driving the same; motor switching means connected to said motor means for switching said motor means on and off; pulse emitting means providing a pulse signal with pulse repetition frequency dependent upon a speed characteristic of said motor vehicle, said speed characteristic being the engine speed of said motor vehicle; frequency-voltage converting means connected to said limiting means for converting the characteristics of said pulse signal in a predetermined manner; astable circuit means connected to said frequency-voltage converting means for transmitting timing pulse signals for operating motor switching means and therefore said windshield wipers as a function of said speed characteristic of said motor vehicle, said astable circuit means having capacitor and discharge resistor means, said discharge resistor receiving the capacitor discharge of said astable circuit for determining the interval between said timing signals; voltage divider means having variable resistor means connected to said discharge resistor means; electronic switching means connected between said frequency-voltage converting means and said variable resistor means of said voltage dividing means for varying the voltage at the junction of said discharge resistor means and said variable resistor means as a function of said speed characteristics; and connecting means connecting said discharge resistor means to said variable resistor means of said voltage divider means whereby said interval between timing signals is adjusted in accordance with said speed characteristic of said vehicle.

7. The arrangement for controlling the operation of windshield wipers as defined in claim 6, wherein said electronic switching means is in the conducting state when said motor vehicle is in the idling state, said electronic switching means being non-conductive when the speed of said motor vehicle exceeds the speed corresponding to the idling state of said motor vehicle.

8. An arrangement for controlling the operation of windshield wipers in a motor vehicle comprising, in combination, motor means coupled to said windshield wipers for driving the same; motor switching means connected to said motor means for switching said motor means on and off; pulse emitting means providing a pulse signal with pulse repetition frequency dependent upon a speed characteristic of said motor vehicle, said speed characteristic being the engine speed of said motor vehicle; frequency-voltage converting means connected to said pulse emitting means for converting the characteristics of said pulse signal in a predetermined manner; astable circuit means connected to said frequency-voltage converting means for transmitting timing pulse signals for operating said motor switching means and therefore said windshield wipers as a function of a speed characteristic of said motor vehicle, said astable circuit means having a discharge resistor, said discharge resistor receiving the capacitor discharge of said astable circuit for determining the interval between said timing signals; adjustable resistor means connected with one terminal to said discharge resistor in said astable circuit means for varying the time intervals associated with said timing signals; and electronic switching means connected to said frequency-voltage converting means and connected in series with said adjustable resistor means through the other terminal of said adjustable resistor means, said adjustable resistor means being manually adjustable and being connected in parallel with said discharge resistor in said astable circuit means when said electronic switching means is in the conducting state, said electronic switching means being conductive when said speed characteristic corresponds to a value above the idling speed of said motor vehicle and said electronic switching means being non-conductive when said motor vehicle is idling whereby said interval between timing signals is adjusted in accordance with said speed characteristic of said vehicle.

References Cited

UNITED STATES PATENTS

| | | | |
|---|---|---|---|
| 2,557,534 | 6/1951 | Cowles | 15—250.12X |
| 2,721,352 | 10/1955 | Oishei | 15—250.12UX |
| 3,188,623 | 6/1965 | Culbertson | 307—132RUX |
| 3,234,447 | 2/1966 | Sauber | 318—327 |
| 3,339,123 | 8/1967 | Riester | 318—443 |
| 3,407,345 | 10/1968 | Fruehauf et al. | 318—443 |

ORIS L. RADER, Primary Examiner

R. J. HICKEY, Assistant Examiner

U.S. Cl. X.R.

15—250.12